United States Patent
Ozgur et al.

(10) Patent No.: US 9,852,870 B2
(45) Date of Patent: Dec. 26, 2017

(54) METHOD FOR THE FABRICATION OF ELECTRON FIELD EMISSION DEVICES INCLUDING CARBON NANOTUBE FIELD ELECTRON EMISSON DEVICES

(75) Inventors: Mehmet Ozgur, Reston, VA (US); Paul Sunal, Arlington, VA (US); Lance Oh, Columbia, MD (US); Michael Huff, Oakton, VA (US); Michael Pedersen, Ashton, MD (US)

(73) Assignee: CORPORATION FOR NATIONAL RESEARCH INITIATIVES, Reston, VA (US)

( * ) Notice: Subject to any disclaimer, the term of this patent is extended or adjusted under 35 U.S.C. 154(b) by 611 days.

(21) Appl. No.: 13/113,378

(22) Filed: May 23, 2011

(65) Prior Publication Data
US 2012/0301981 A1  Nov. 29, 2012

(51) Int. Cl.
| | |
|---|---|
| H01L 21/00 | (2006.01) |
| H01J 1/02 | (2006.01) |
| H01J 1/304 | (2006.01) |
| H01J 9/02 | (2006.01) |
| B82Y 40/00 | (2011.01) |
| B82Y 10/00 | (2011.01) |

(52) U.S. Cl.
CPC .............. *H01J 1/304* (2013.01); *B82Y 10/00* (2013.01); *B82Y 40/00* (2013.01); *H01J 9/025* (2013.01); *H01J 2201/30469* (2013.01)

(58) Field of Classification Search
CPC ................................ H01J 1/304; H01J 1/3044
USPC ........................................... 438/20, 947, 460
See application file for complete search history.

(56) References Cited

U.S. PATENT DOCUMENTS

| | | | | |
|---|---|---|---|---|
| 4,008,412 A | * | 2/1977 | Yuito ...................... | H01J 9/025 313/309 |
| 4,513,308 A | * | 4/1985 | Greene ................... | H01J 1/308 257/10 |
| 4,968,382 A | * | 11/1990 | Jacobson ................ | H01J 9/025 204/192.35 |

(Continued)

OTHER PUBLICATIONS

Weston D. et al. "Plasma Etched Micromachined Silicon Stampers for Plastic Biotechnology Applications", Electrochemical Society Proceedings, vol. 2002-17 (2002), pp. 227-238.*

(Continued)

*Primary Examiner* — Telly Green
(74) *Attorney, Agent, or Firm* — Nixon & Vanderhye PC

(57) ABSTRACT

The present invention is directed to a method for the fabrication of electron field emitter devices, including carbon nanotube (CNT) field emission devices. The method of the present invention involves depositing one or more electrically conductive thin-film layers onto a electrically conductive substrate and performing lithography and etching on these thin film layers to pattern them into the desired shapes. The top-most layer may be of a material type that acts as a catalyst for the growth of single- or multiple-walled carbon nanotubes (CNTs). Subsequently, the substrate is etched to form a high-aspect ratio post or pillar structure onto which the previously patterned thin film layers are positioned. Carbon nanotubes may be grown on the catalyst material layer. The present invention also described methods by which the individual field emission devices may be singulated into individual die from a substrate.

65 Claims, 7 Drawing Sheets

(56) References Cited

U.S. PATENT DOCUMENTS

| | | | | | |
|---|---|---|---|---|---|
| 4,973,378 | A | * | 11/1990 | Lee | H01T 4/12 216/20 |
| 5,320,570 | A | * | 6/1994 | Kane | H01J 9/025 313/336 |
| 5,399,238 | A | * | 3/1995 | Kumar | H01J 9/025 204/192.15 |
| 5,583,393 | A | * | 12/1996 | Jones | H01J 1/304 313/309 |
| 5,647,785 | A | * | 7/1997 | Jones | H01J 1/3042 445/24 |
| 6,083,767 | A | * | 7/2000 | Tjaden | H01J 9/025 438/20 |
| 6,171,164 | B1 | * | 1/2001 | Wilson | H01J 9/025 445/50 |
| 6,387,717 | B1 | * | 5/2002 | Blalock | H01J 1/304 313/309 |
| 6,444,513 | B1 | * | 9/2002 | Besser et al. | 438/216 |
| 6,740,600 | B2 | * | 5/2004 | Ghoshal | H01L 35/16 136/203 |
| 7,829,358 | B2 | * | 11/2010 | Duong et al. | 438/20 |
| 2002/0016080 | A1 | * | 2/2002 | Khan | H01L 21/3065 438/714 |
| 2002/0125805 | A1 | * | 9/2002 | Hsu | B82Y 10/00 313/309 |
| 2005/0236357 | A1 | * | 10/2005 | Bakkers | B82Y 10/00 216/2 |
| 2007/0035227 | A1 | * | 2/2007 | Haba | H01J 1/304 313/309 |
| 2007/0148991 | A1 | * | 6/2007 | Schwind | H01J 1/304 438/800 |
| 2007/0247048 | A1 | * | 10/2007 | Zhang | B82Y 10/00 313/311 |
| 2008/0061029 | A1 | * | 3/2008 | Lai | B81C 1/00626 216/37 |
| 2008/0237483 | A1 | * | 10/2008 | Nguyen | B82Y 10/00 250/396 R |
| 2009/0072750 | A1 | * | 3/2009 | Akinwande et al. | 438/20 |
| 2010/0045212 | A1 | * | 2/2010 | Mancevski | 315/326 |
| 2012/0301981 | A1 | * | 11/2012 | Ozgur | H01J 1/304 438/20 |

OTHER PUBLICATIONS

Wu B. et al. "High aspect ratio silicon etch: A review", J. Appl. Phys. 108, 051101 (2010), pp. 1-20.*

* cited by examiner

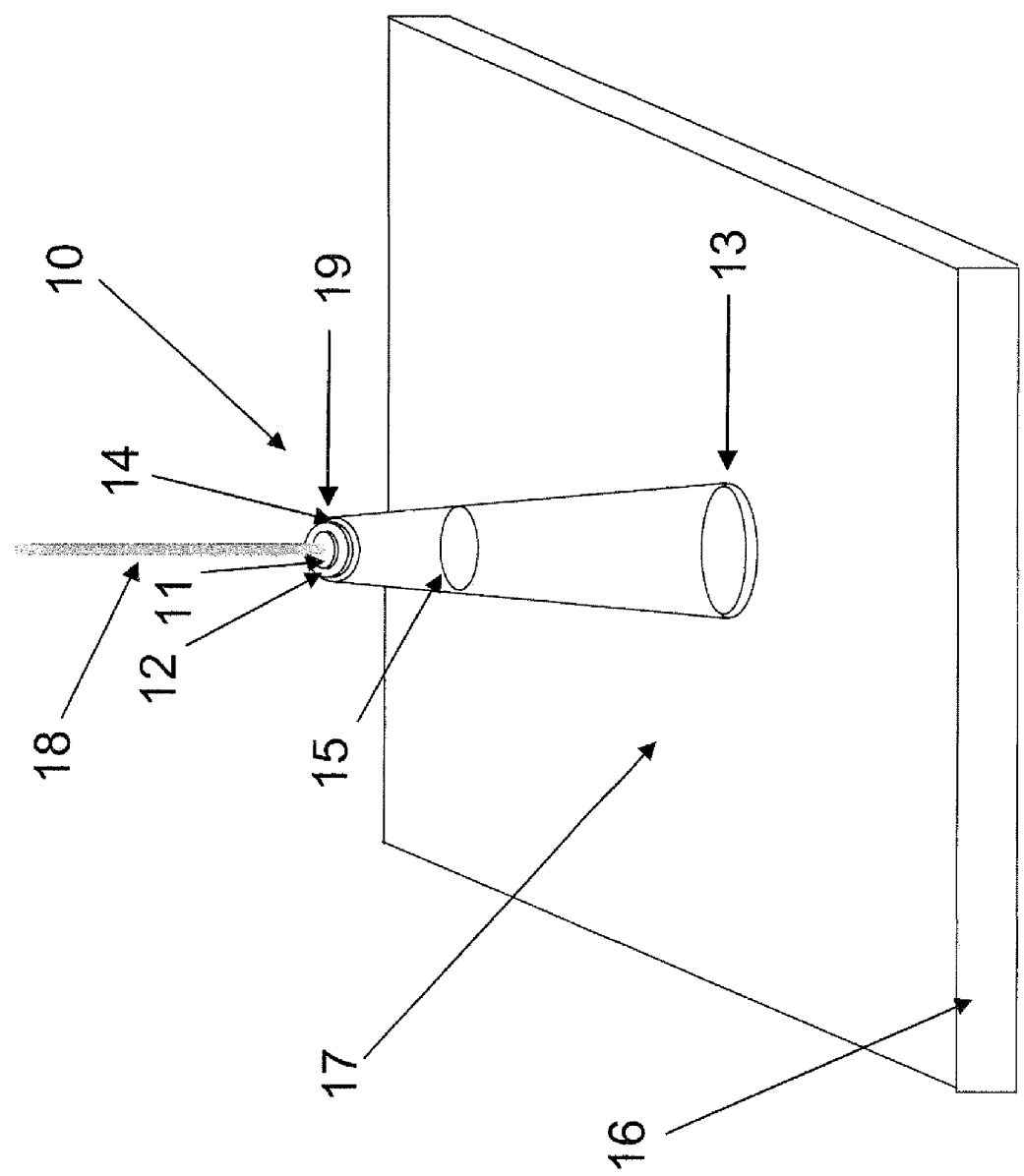
Figure 1: Illustration of Field Emission Device with Carbon Nanotube Emitter

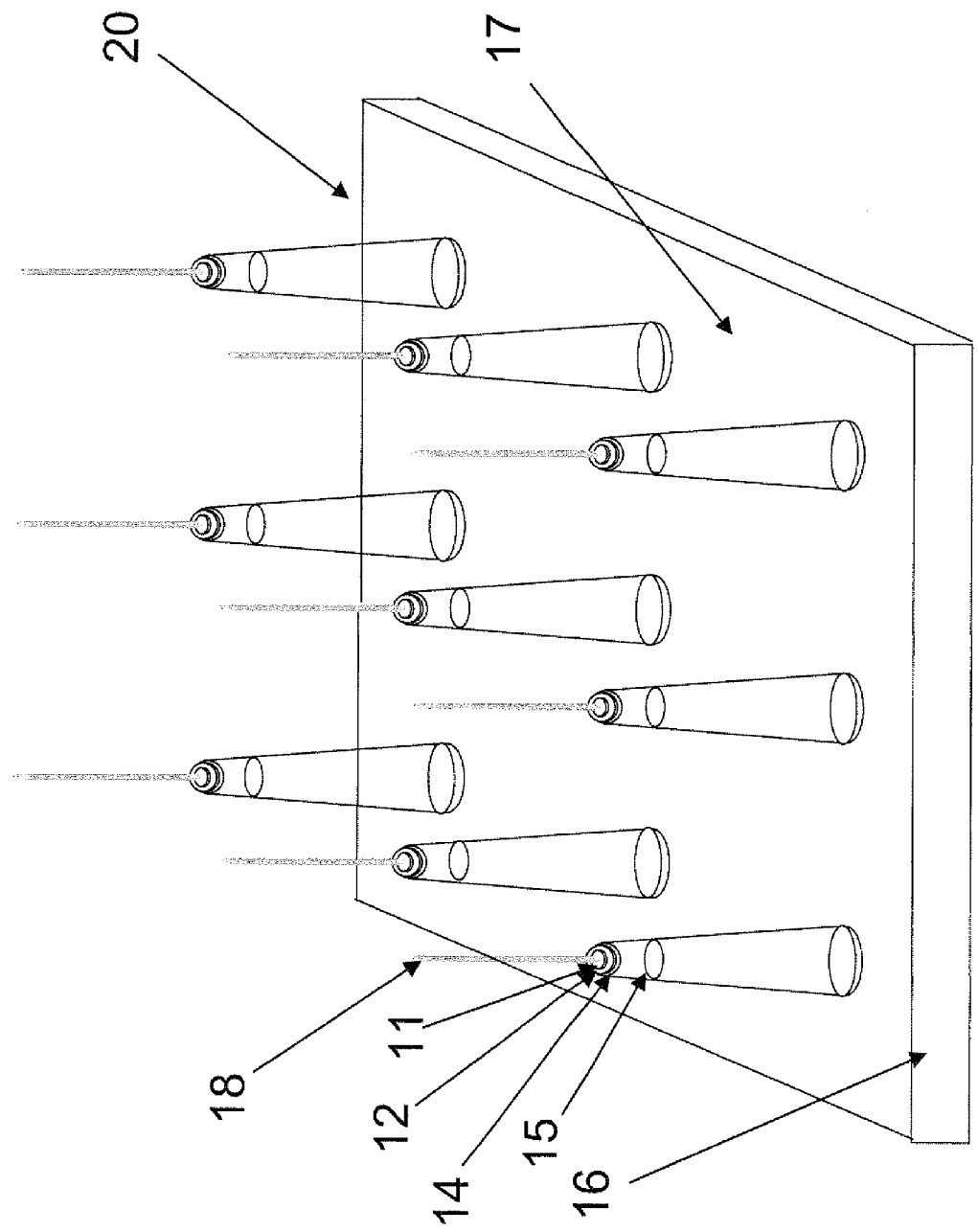
Figure 2: Illustration of Array of Field Emission Devices with Carbon Nanotube Emitters

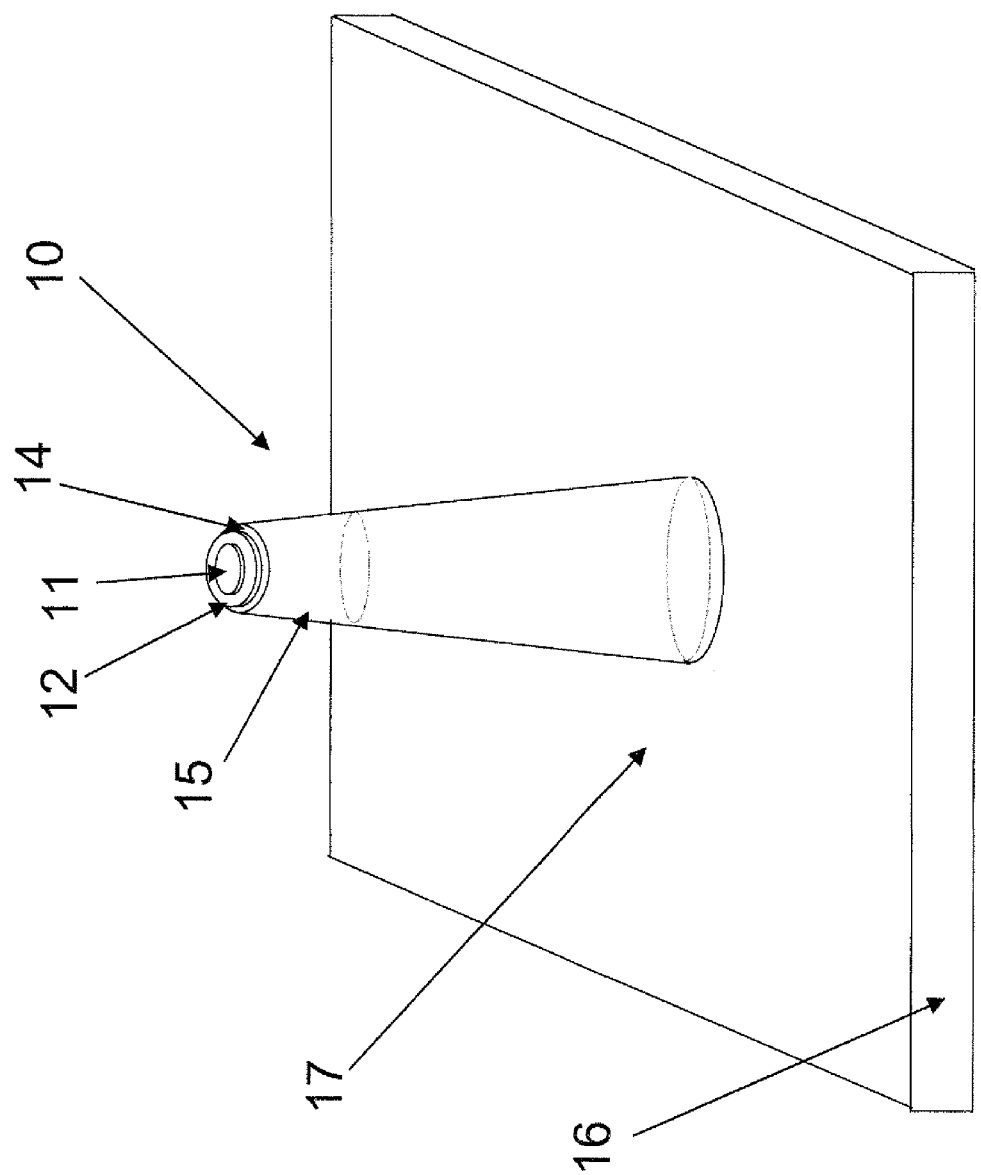
Figure 3: Illustration of Field Emission Device without carbon nanotubes.

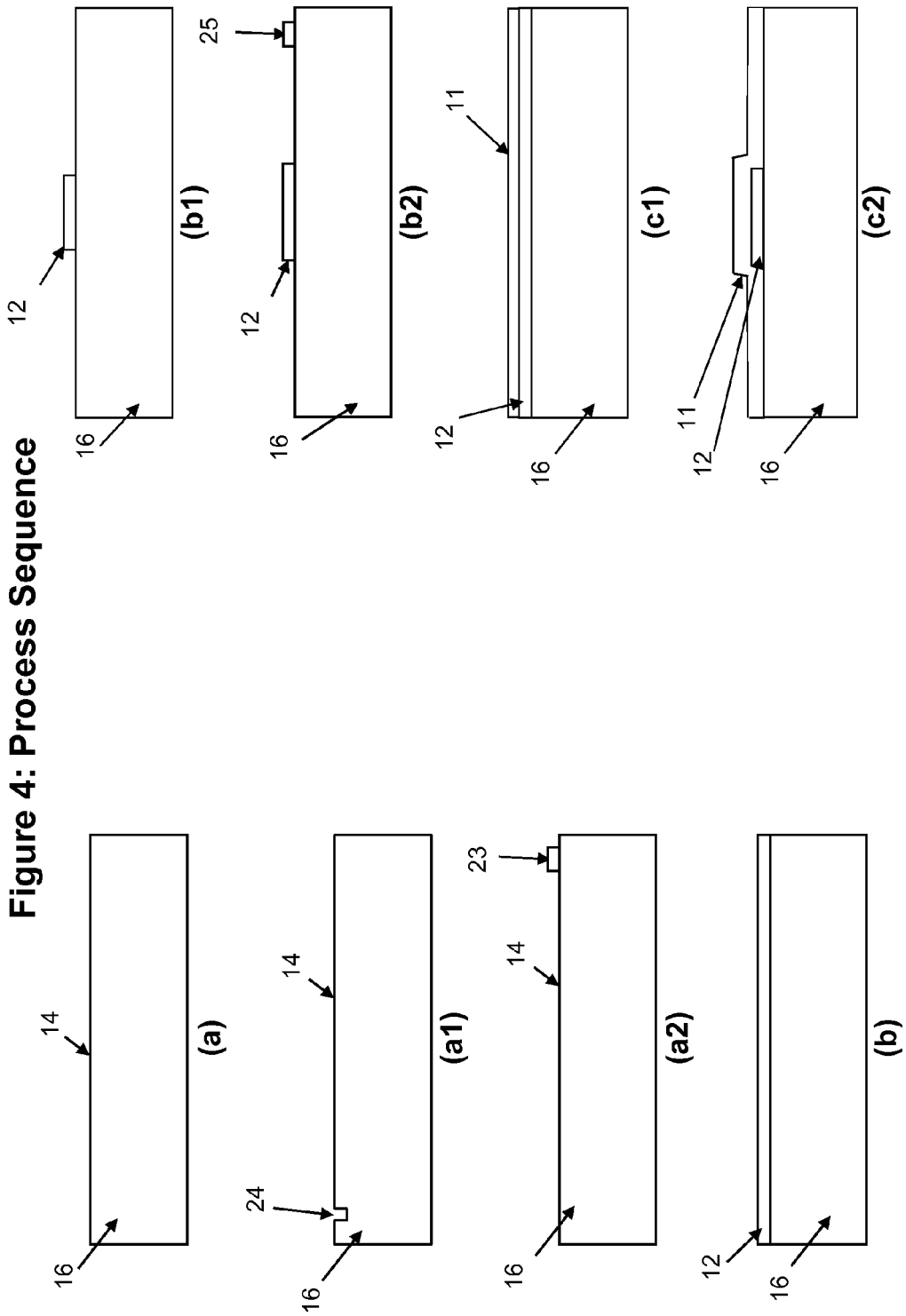

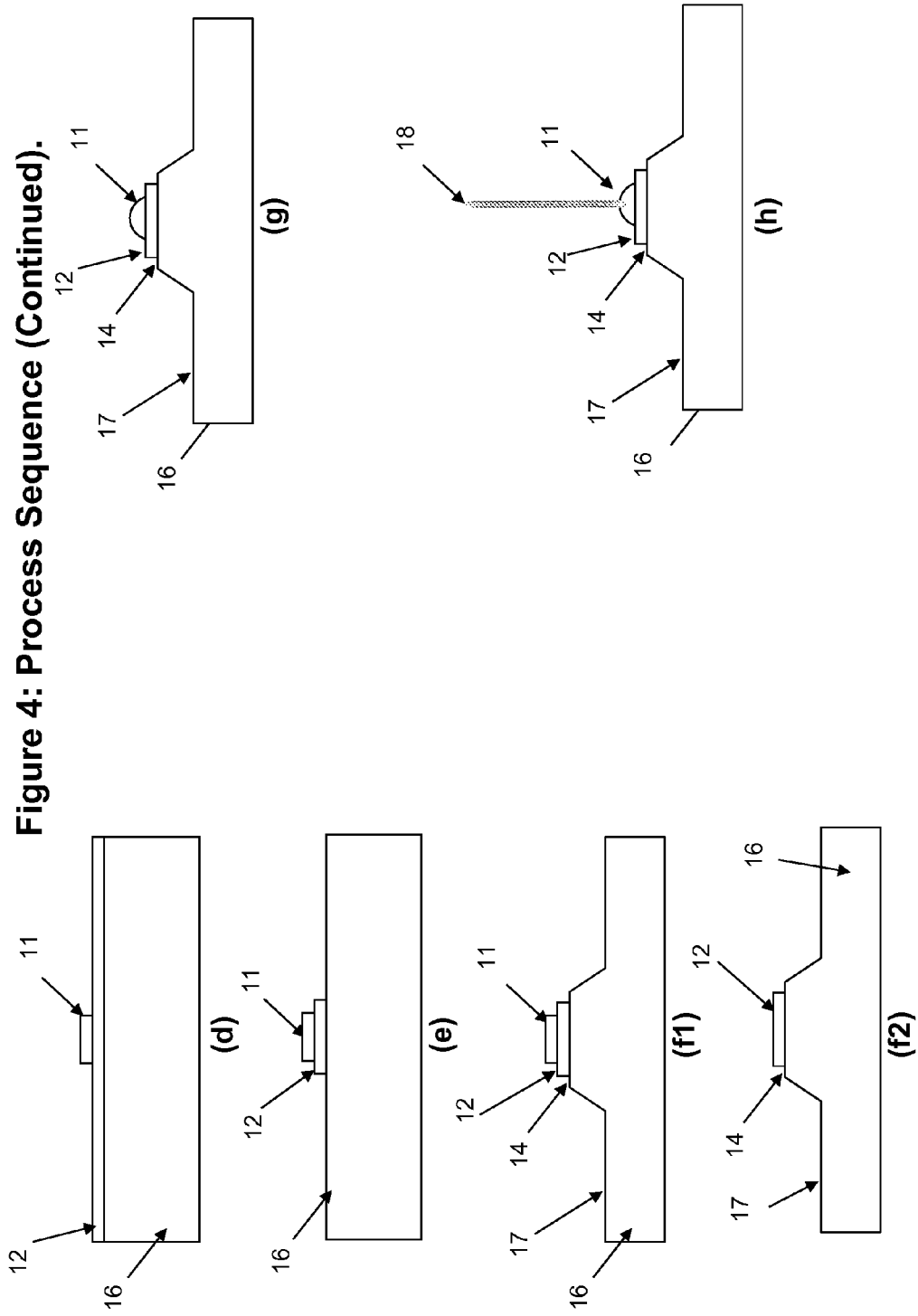

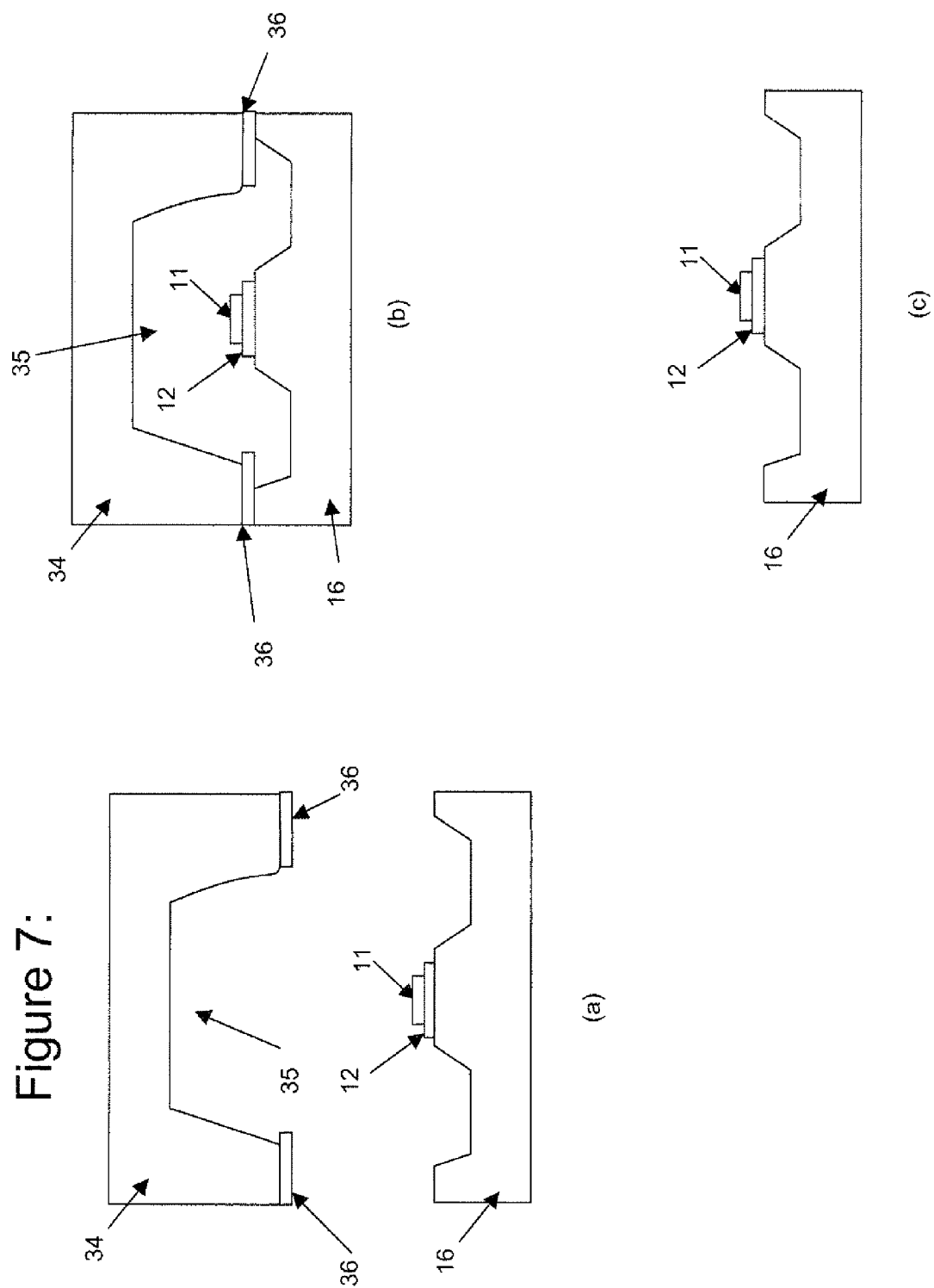

METHOD FOR THE FABRICATION OF ELECTRON FIELD EMISSION DEVICES INCLUDING CARBON NANOTUBE FIELD ELECTRON EMISSON DEVICES

FIELD OF INVENTION

The present invention is directed to a method for the fabrication of electron field emitter devices, including carbon nanotube (CNT) field emission devices. These devices have application in any product or system employing electron beams or sources, including: electron-beam imaging; electron-beam lithography; field electron spectroscopy; electron-gun sources; atomically shaped emitter tips; electron-beam sensing; etc. These devices can be implemented as single field emitter devices or as arrays of field emitter devices, even very large arrays of field emitter devices. The present invention is applicable to the implementation of any electron-beam field emitter structure, with or without the employment of carbon nanotubes as the field emitter of electrons. The present invention allows large field emitter arrays to be implemented for faster through-put electron-beam imaging and electron-beam lithography.

BACKGROUND OF THE INVENTION

Electron field emission is an emission of electrons induced by external electromagnetic fields. Field emission can happen from solid and liquid surfaces, or individual atoms into vacuum or open air, or result in promotion of electrons from the valence to conduction band of semiconductors.

Field emission in pure metals occurs in high electric fields: the gradients are typically higher than 1000 volts per micron and strongly dependent upon the work function of the metal. Electron sources based on field emission have a number of applications, including electron sources for high-resolution electron microscopes and electron-beam lithography. Field emission is explained by quantum tunneling using the Fowler-Nordheim equations.

Although electron field emitters have been known for some time and there are a number of methods that have been employed to implement these emitters, most emitters have an aspect ratio, that is a height-to-diameter ratio, that is very limited. It is often desired that the emitter have an atomically-sharp-shaped end, be composed of highly conductive materials, and have a height from the substrate surface of a significant amount. Consequently, structures meeting these requirements are difficult to implement.

More recently, enormous interest has been shown in using carbon nanotubes, either single-walled or multi-walled carbon nanotubes, as field emitters due to the excellent material properties of carbon nanotubes. In general, carbon nanotubes have a limited height that they can be grown and this height is not sufficient to reduce the electrical field effects from the substrate floor. Therefore, it is desired that the carbon nanotube be implemented onto a highly-conductive material formed into high-aspect ratio structure. These structures are also difficult to implement.

SUMMARY OF INVENTION

The present invention is directed to a method for the fabrication of electron field emitter devices, including carbon nanotube (CNT) field emitter devices. These devices have application in any product or system employing electron beams or sources, including: electron-beam imaging; electron-beam lithography; field electron spectroscopy; electron-gun sources; atomically sharp emitter tips; electron-beam sensing; etc. These devices can be implemented as single emitters or as arrays, even very large arrays of emitters. The present invention is applicable to the implementation of any electron-beam field emitter structure, with or without the employment of carbon nanotubes as the emitter of electrons. The present invention allows large field emitter arrays to be implemented for faster through-put electron-beam imaging and electron-beam lithography.

The present invention employs the techniques of Micro-Electra-Mechanical Systems (MEMS), Nano-Electra-Mechanical Systems (NEMS), and micro- and nano-fabrication for the implementation of electron field emitter devices. In addition, the present invention is applicable as a method of implementation for any type of emission device.

The present invention is a method of cost effectively fabricating high-performance field emission devices for a variety of useful applications.

BRIEF DESCRIPTION OF THE DRAWINGS

FIG. 1 is an illustration of a field emission device with a carbon nanotube emitter according to the invention.

FIG. 2 is an illustration of an array of field emission devices with carbon nanotube emitters according to the invention.

FIG. 3 is an illustration of a field emission device without carbon nanotubes according to the invention.

FIG. 4 is a cross-sectional view illustrating a fabrication sequence of a field emission device according to the invention.

FIG. 7 is a cross-sectional illustration of a third preferred method for the separation of the field emission device substrate.

DETAILED DESCRIPTION OF THE INVENTION

Figure 5:
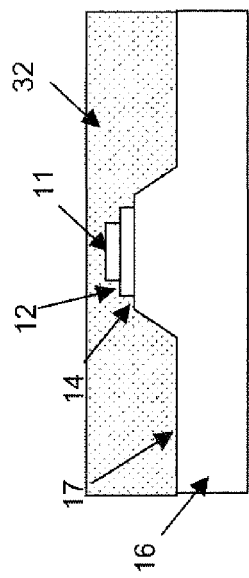
FIG. 5 is a cross-sectional illustration of a first preferred method for the separation of the field emission device substrate.

The present invention is directed to a method for the fabrication of carbon nanotube (CNT) electron field emitter devices. These devices have application in any product or system using electron beams including: electron-beam imaging; electron-beam lithography; field electron spectroscopy; electron-gun sources; atomically sharp emitter tips; electron-beam sensing; and many more. These devices can be implemented as single field emitters or as arrays of field emitters, even very large arrays of field emitters, including but not limited to arrays of tens, hundreds, thousands, millions, or tens of millions of emitters, or more. The present invention is applicable to the implementation of any electron-beam field emitter structure, with or without the employment of carbon nanotubes as an emitter of electrons. The present invention allows large field emitter arrays to be implemented for fast throughput electron-beam imaging, electron-beam lithography that have application in semiconductor fabrication, as well as many other important applications.

Electron field emission is an emission of electrons induced by external electromagnetic fields. Field emission can happen from solid and liquid surfaces, or individual atoms into vacuum or open air, or result in promotion of electrons from the valence to conduction band of semiconductors.

Field emission in pure metals occurs in high electric fields: the gradients are typically higher than 1000 volts per micron and strongly dependent upon the work function of the metal. Electron sources based on field emission have a number of applications, including electron sources for high-resolution electron microscopes and electron-beam lithography. Field emission can be analytically modeled by quantum tunneling using the Fowler-Nordheim equations.

Although electron field emitters have been known for some time, and there are a number of methods that have been employed to implement these emitters, most emitters have a limited height-to-diameter aspect ratio. Also, most field emitters at the micro- and nano-scale have limited tip heights (i.e., distance from the surfaces where the electrons are emitted from to the surrounding substrate). It is often desired that the emitter have an atomically-sharp tip, be composed of highly conductive materials, have a height from the substrate surface of a significant amount, and a large height compared to the diameter over all or some portion of the device (i.e., large aspect ratio). Consequently, these structures meeting these requirements are difficult to implement.

More recently, enormous interest has been shown in using carbon nanotubes, either single-walled or multi-walled carbon nanotubes, as field emitters due to the excellent material and electrical properties of carbon nanotubes. In general, carbon nanotubes have a limited height that they can be grown, and this height is not sufficient to reduce the field effects from the substrate floor. Therefore, it is desired that the carbon nanotube be implemented on a highly-electrically conductive material formed into a structure having the desirable emitter structural properties discussed above as well as certain specific material properties conducive to carbon nanotube growth and device operation. These structures are also difficult to implement.

The present invention is directed at a method for the fabrication of electron field emission devices including, but not limited to carbon nanotube electron emission devices in a cost effective and efficient manner using the techniques of Micro-Electro-Mechanical Systems (MEMS), Nano-Electro-Mechanical Systems (NEMS), and micro- and nano-fabrication for the implementation. A key element of the method of the present invention is the plasma etch technology used to implement the high-aspect ratio pillar or post structures having sloping sidewalls.

FIG. 1 is a drawing of a single field emitter device 10 of the present invention. FIG. 2 is an array of field emitters to form a device 20 which is illustrated as a plurality of these devices arranged across the substrate in any desired number, density, and pattern as desired for a given application. As shown in FIGS. 1 and 2 the field emitter devices 10 and 20 are made on a substrate 16 and has pillar or post (hereafter the terms "pillar" and "post" will be used interchangeably) structures 15 that are preferably made of an electrically conductive first material. It is preferable that this material be micro- or nano-machined using appropriate fabrication techniques. There are several material choices for the pillar structure 15, including, but not limited to silicon, and more preferably, highly electrically conductive silicon. The substrate and the pillar may or may not be made of the same material, depending on the design and application in which the field emitter device 10 or 20 may be used. Alternatively, other semiconductors or metals may be used for this structure. This pillar structure 15 may have a shape wherein the diameter of the top 19 of the pillar structure 15 is equal to or less than the diameter of the pillar structure 15 at the base 13, as shown in FIGS. 1 and 2. This shape may be preferred since it provides increased mechanical stability and better electrical performance due to the ability to concentrate the electrical field at the emitter tip.

The top 19 of the post structure 15 is preferably extremely flat, smooth and uniform and preferably uses the top surface of a silicon virgin substrate 14, wherein the surface qualities of semiconductor-grade silicon wafers are excellent for this application. The pillar structure 15 can be formed by etching or by other means of micro- or nano-machining.

On the top surface 14 of the pillar structure 15 can be located a second material 12 that is conductive to electrons. Preferably, material 12 is highly conductive to electrons. The thickness of this layer 12 can be less than 10 nanometers, between 10 and 100 nanometers, or more than 100 nanometers depending on the properties desired of the emitter, the type of material layer 12 used, and the processing complexity and compatibility issues involved in the fabrication of the device 10 or 20. This layer 12 may also serve as a diffusion barrier to carbon nanotube catalyst materials during their growth if the field emitter employs carbon nanotube(s) 18 at the tip(s) of the field emission devices 10 and 20. Preferably, the material layer 12 has a surface that is smooth. Preferably, this material layer 12 can be chosen from a number of material types meeting the above-mentioned criteria, including but not limited to a layer of Titanium-Nitride (TiN). The diameter of the material layer 12 can be varied, depending on the emitter device 10 and 20 properties, and preferably is between 300 and 500 nanometers, although dimensions below and above this range may be acceptable, or even desirable for certain applications. The thickness of the material layer 12 made of TiN can be varied, depending on the field emitter device 10 and 20 properties, and preferably is approximately 50 nanometers thick, although thickness less than or greater than this amount may be acceptable or even desirable for certain applications.

On the top surface of this material layer 12, which is located on the top surface 14 of the pillar structure 15, may be located a third material layer 11 that is conductive to electrons. Material layer 11 may be a catalyst for CNT growth as mentioned below, whereas material layer 12 is not. The thickness of this layer 11 can be less than 5 nanometers, between 5 and 10 nanometers, or more than 10 nanometers depending on the properties desired of the field emitter device 10 and 20. Preferably, this third material layer 11 is composed of a 5 to 12 nanometer thick layer of nickel (Ni), although other materials and thickness may be used, depending on the specifics of the field emitter device 10 and 20 design. The diameter of this third material layer 11 can be varied, depending on the emitter properties, and preferably is between 100 and 150 nanometers, although other dimensions may be suitable, depending on the specifics of the field emitter device 10 and 20 design. This third material layer 11 may also act as a catalyst material for the growth of carbon nanotubes subsequent to the field emitted device structure fabrication. Depending on the diameter and thickness of the third material layer 11 acting as a catalyst, single or multi-walled carbon nanotubes may be grown.

The pillar structures 15 onto which layers 12 and 11 are fabricated can be etched using a process for micromachining of the first layer material substrate 16, including but not limited to deep silicon etching, if the first material substrate 16 is silicon, and to a depth of 10 microns or less, or preferably to a depth between 10 and 30 microns, and more preferably to a depth of 30 microns or more, depending on the field emitter device 10 and 20 properties desired. The depth is measured from the top surface of the emitter structure without the nanotube(s), that is, either the top of layer 12 or 11 to the floor of the substrate surface 17 surrounding the pillar or posts structure(s) 15. It is desirable that the substrate surface 17 maintain a smooth surface after etching.

It is preferable that the sidewalls of the pillar or post structure 15 are smooth, with no sharp edges or features that protrude outwardly so as to concentrate the electrical field at the emitter tip. It is also may be more preferable that the top 14 of the pillar structures 15 have no sharp corners.

After completion of the pillar structure 15 with one or more patterned layers 12 and 11 on the top surface, carbon nanotubes 18 may be grown on the surface of the third material layer 11, as shown in FIGS. 1 and 2. The carbon nanotubes 18 may be single-walled or multi-walled carbon nanotubes 18 depending on the desired properties of the field emission device 10 or 20. The carbon nanotubes can be grown using means of Chemical Vapor Deposition (CVD).

Alternatively, as shown in FIG. 3, the field emission device 10, may also be implemented, whereby the carbon nanotubes 18 are not present, which may be desirable for certain applications. The device may also be implemented in arrays of field emitters without carbon nanotube field emission tips.

The preferred method for fabrication of the field emission device 10 or 20, also know as the process sequence for the device 10 or 20, is illustrated in FIG. 4. This process sequence has several preferred variations and begins with a highly electrically conductive substrate made of a first material 16, as shown in FIG. 4 (a). In one embodiment, this first material substrate 16 is composed of highly-doped silicon. Importantly, the substrate may be made of other semiconductor materials or metal, depending on the device requirements and application.

Depending on the thickness, type of material, and lithography technique used, the ability to align subsequent layers to one another using alignment marks made in a second material layer can be difficult. For example, it can be difficult to align subsequent layers to alignment marks in the second material layer 12, depending on the low value of thickness of the second material layer 12 combined with the electrical conductively of the patterned second material layer 12 on the surface of a conductive substrate material 16, such as highly-doped silicon, when using e-beam lithography. This issue may be overcome by using a thicker second material layer 12 or by etching through the second material layer 12 and continuing the etching some depth into the surface 17 of the first substrate material 16.

An alternative embodiment of the process may be used to overcome this problem, as shown in FIG. 4 (a1). Specifically, a layer of photoresist may be deposited on the surface 14 of the first material substrate 16 prior to the deposition of the second material layer 12. Then, using appropriately high-resolution lithography, the photoresist is exposed to define a pattern of alignment marks 24. Subsequently, the exposed surface 14 of the first material substrate 16 can be etched to implement alignment marks 24 directly into the surface 14 of the first material substrate 16, as shown in FIG. 4 (a1). The formation of these alignment marks 24 in the surface 14 of the first substrate material 16 may be done before the second material layer 12 has been deposited, as illustrated in FIG. 4 (a1), or thereafter.

The etching into the surface 14 of the first material substrate 16 to make the alignment marks 24 as shown in FIG. 4 (a1) can be performed using Reactive Ion Etching (RIE), Deep Reactive Ion Etching (DRIE), wet chemical etching, as well as any etching technique appropriate for the type of material used in the first material substrate 16. DRIE is preferred in the use of silicon as the first material substrate 16, since the amount of undercut of the mask will be minimized with the use of DRIE. The depth of the etch into the surface 14 of the first substrate material 16 must be adequate to provide sufficient contrast for the lithography tool to image the alignment marks 24 and thereby accurately register the subsequently lithography steps to one another. This depth of the etch to form the alignment larks 24 will depend on the lithography technology used, as well as the lithography tool, but a preferred depth can be less than 0.5 micron, or between 0.5 to 1.0 micron, or more than 1.0 micron.

Yet another alternative method of creating alignment marks, as illustrated in FIG. 4 (a2), is to deposit a fourth material layer 23 on the surface 14 of the first material substrate 16 and subsequently perform lithography and etching to pattern appropriate alignment marks in this fourth material layer 23 on the surface 14 of the first material substrate 16 before the second material layer 12 has been deposited, as shown in FIG. 4 (a2). The thickness of this fourth material layer 23 forming the alignment marks 23 depends on obtaining sufficient contrast between this material layer 23 and the highly-doped first substrate material 16 in the lithography tools, and could be selected from a large number of thin film material layer types, including, but not limited to: dielectrics (e.g., oxides, nitrides, oxy-nitrides, etc.); metals (e.g., aluminum, platinum, etc.); polymers (e.g., photoresist, polyimide, etc.); etc.

A thin-film second material layer 12 that is highly electrically conductive may be deposited on the surface 14 of the first material substrate 16 as shown in FIG. 4 (b). As discussed above, the deposition of highly electrically conductive material layer 12 may be done on substrate 16 either with alignment marks 24 or 23 illustrated in FIGS. 4 (a1) and 4 (a2), respectively, or with no alignment marks on substrate 16, as shown in FIG. 4 (b), if the alignment can be performed without alignment marks, as also discussed above. If a carbon nanotube field emission device 10 or 20 (FIG. 1 or 2) is being implemented, it may be preferable that the second material layer 12 also acts as a diffusion barrier for the carbon nanotube catalyst material 11 that will be deposited later. A number of different material types can be used for this second material layer 12, including but not limited to a layer of Titanium-Nitride (TiN) on the surface 14 of the first substrate material 16. The important material and electrical properties of the second material layer 12 include: good electrical conductivity; good adhesion to the underlying substrate material 16; and an ability to be patterned and etched in the appropriately-sized dimensions for the field emission device 10 and 20. If carbon nanotubes 18 are desired (FIG. 1 or 2) on the field emission devices 10 and 20, the second material layer 12 should also be an excellent barrier to the diffusion of the third material layer 11 into the substrate material 16. It is also preferable that surface of the second material layer 12 have a smooth surface, and more preferable is the surface of the second material layer 12 is atomically smooth. The second material layer 12 should also be compatible with the other materials used in the device 10 and 20 and the fabrication processing steps used in implementation of the device 10 and 20.

The thickness of this second material layer 12 can be less than 50 nanometers, between 50 and 100 nanometers, or more than 100 nanometers, depending on the properties desired of the emitter device 10 and 20. The diameter of the material layer 12 can be varied, depending on the emitter device 10 properties and preferably is between 300 and 500 nanometers, although dimensions below and above this amount may be acceptable or even desirable for certain applications. The thickness of the material layer 12 made of TiN can be varied, depending on the emitter device 10 and 20 properties, and preferably is approximately 50 nanometer thick.

The deposition for the second material layer 12 can be done using Chemical-Vapor Deposition (CVD) or Physical-Vapor Deposition (PVD) processes, including reactive PVD processes, or Atomic Layer Deposition (ALD). One example of a preferred method of depositing the second material layer 12 includes a reactive sputtering deposition process. If the second material layer 12 is composed of TiN, the source material can be sputtered from a titanium target and the titanium reacts with the background nitrogen (N2) gas during deposition to form. Titanium-Nitride (TiN). The preferred sputtering process parameters are: 3 milli-Torr pressure of Ar/N2 at 50 standard cubic centimeters per minute operating at a target sputtering power of 2000 Watts and a 350 kHz asymmetric pulsed-DC frequency with a 1.1 microsecond reverse phase duration. It is desired that the percentage of Titanium to Nitrogen in the deposited TiN film layer be approximately 50% to 50%, respectively. However, other sputtering and evaporation processes may be used and provide equally desirable results for deposition of the second material layer 12.

Another example of a preferred embodiment for deposition of the second material layer 12 includes a reactive evaporation deposition process, whereby the source material is evaporated from a titanium target and the titanium reacts with the background nitrogen gas during the deposition and on the surface of the substrate. The preferred evaporation process parameters are: 0.75 milli-Torr N2 background gas with evaporation from a titanium source material and ion-assisted deposition from an ion source using Argon (Ar) and N2 to modify the TiN film in situ. Yet another example of a preferred embodiment for the deposition of the second material layer 12 includes a sputtering deposition process, whereby the source material is sputtered from a Titanium-Nitride target and the Titanium-Nitride deposits on the surface of the substrate. The preferred sputtering process parameters are: 5 milli-Torr Ar/N2 at 50 standard centimeters per minute of Ar, and 10 standard centimeters per minute N2 at a target sputtering power of 2000 Watts and a 350 kHz asymmetric pulsed-DC frequency with a 1.1 microsecond reverse phase duration.

Once the second material layer 12 has been deposited, it may be desirable to anneal this layer. This can be done using an anneal furnace or a rapid-thermal anneal (RTA) process, or other means, as appropriate. The anneal may be performed with a background non-reactive gas such as Nitrogen or Argon and at a temperature of approximately 800° C. for 30 seconds, if the second material layer 12 is composed of a TiN thin film. Other annealing temperatures may be desirable if the second material layer 12 is composed of a different material type or composition.

It may be desirable to anneal the second material layer 12 soon or immediately after the deposition of this layer. This may be desirable to avoid contamination or oxidation of this second material layer 12. Alternatively, it may be desirable to perform the anneal within the same chamber that the second material layer 12 was deposited, that is in-situ anneal, and thereby avoid exposing the second material layer 12 to the ambient environment until after the anneal has been completed.

Subsequently, a third material layer 11 will be deposited on the second material layer 12, as shown in FIG. 4 (c1). The third material layer 11 will preferably be electrically conductive. Additionally, it may be preferable that this third layer material 11 is also a catalyst for the growth of carbon nanotubes 18. Many material types can be chosen for this third layer material 11, including but not limited to Nickel, Cobalt, Molybdenum, Iron, or their combinations. The choice of catalyst depends on many factors, including but not limited to, surrounding materials, process temperature/conditions, and desired nanotube properties. For example, nickel works when it is within an electrically conductive path; whereas, Iron works best if it is electrically insulated. Exact nature of the CNT growth is not well understood yet. Co alone tends to produce multi-walled CNTs, but when combined with Mo, Co—Mo composite is very effective for single-walled CNT growth. However, Mo alone doesn't work at typical low-temp (700 C) growths, but has a high efficiency single-walled growth at high-temperatures (1200 C). Preferably the third material layer 11 will have a thickness that can be less than 5 nanometers, between 5 and 10 nanometers, or more than 10 nanometers, depending on the properties desired of the emitter device 10 and 20.

The third material layer 11 may be deposited using a number of commonly used deposition technologies including: evaporation, sputtering, atomic layer deposition, etc.

After deposition of the third material layer 11, lithography is performed to pattern and etch this third material layer 11 into the first predefined shapes and dimensions. The dimensional resolution of the lithography must be able to create sub-micron features with sub-micron registration accuracy for each layer. The lithography can be performed by several means, including e-beam direct write lithography, interference lithography, and Deep Ultra-Violet (Deep UV or DUV) optical lithography.

The third material layer 11 is then etched, as shown in FIG. 4 (d), using appropriate means of etching that can include, but is not limited to: Reactive Ion Etching (RIE), ion milling, as well as wet chemical etching means, as shown in FIG. 4 (d). It is preferable that the etch technology used, etch the third material layer 11 at a rate greater than the underlying second material layer 12. It is also preferable that the etch process used on the third layer 11 be as uniform across the substrate as possible.

If ion milling is used to pattern the third material layer 11, material may re-deposit around the perimeter of the masked features. This can make the removal of the masking photo-resist layer very difficult. It can modify the dimensions of the features being patterned in the third material layer 11, and it can leave behind unwanted material on the features. This is a common and undesirable attribute of ion milling, but can be readily resolved by performing a short in time duration ion milling at an oblique angle after the third material layer has been completely removed from the undesired areas. Re-deposition caused by ion milling can also be removed by ion milling at an oblique angle for periods of short times periodically during the ion milling from a more vertical or normal angle to the substrate.

The diameter of the third material layer 11 can be varied, depending on the emitter device 10 and 20 properties, and preferably is between 100 and 150 nanometers, although dimensions below and above this range may be acceptable or even desirable for certain applications. The thickness of the material layer 11 made of Nickel can be varied, depending on the emitter device 10 and 20 properties, and preferably is approximately 7 to 10 nanometers thick, although lesser or greater thicknesses may be desirable, depending on the material combination used and the field emitter properties desired.

If reactive ion etching or ion milling is used to pattern the third material layer 11, the photoresist mask may become hardened due to the exposure to the plasma or ions that are involved in this process, and thereby, the photoresist may become difficult to subsequently remove. Care must be taken in the resist removal process, given the thickness of the third material layer 11, to prevent removal, damage, degradation or contamination of the third material layer 11. This is important, given the extreme thinness of the third material layer 11.

Depending on the type of material used for this layer, it may be desirable to perform an oxygen plasma exposure for a short duration of time to remove the hardened crust of photoresist. Subsequently, the remainder of the resist can be removed by other means, including but not limited to, a solvent wet immersion strip. It may be important to not remove the entirety of the resist with an oxygen plasma, since exposure of the third material layer 11 to the plasma may oxidize, damage, or remove this layer.

A second preferred method of patterning the third material layer 11 uses a technique known as "lift-off", which is an additive method for layer patterning, as opposed to subtractive methods of patterning, such as etching. Using "lift-off," lithography is performed on the surface of the second material layer 12 of the substrate 16 using the inverse pattern of the third material layer 11. After exposure and development, as well as a possible cleaning to remove any residual polymers left in the openings, the third material layer 11 is deposited. Subsequently, the photoresist is lifted-off, thereby removing the unwanted material that is deposited on the resist and leaving behind the patterned third material layer 11 where it was deposited directly onto the underlying substrate surface (i.e., in places where the resist was absent) as shown in FIG. 4(d).

Lithography is performed to pattern and then etch the second material layer 12 to form layer 12 into the second predefined shapes and dimensions, as illustrated in FIG. 4(e). The lithography is used to define the second material layer 12 into shapes of the second material layer 12 at the top of the emitter devices. These shapes are preferably circular, although other shapes may be possible or even desirable. Importantly, the dimensional resolution of the lithography must be able to create sub-micron features with sub-micron registration accuracy for each layer. The lithography can be performed by several means including, but not limited to, e-beam direct write lithography, interference lithography, or Deep Ultra-Violet (Deep UV or DUV) optical lithography.

The etching of the second material layer 12 can be performed using Reactive Ion Etching (RIE) or Deep Reactive Ion Etching (DRIE), ion milling, as well as wet chemical etching means resulting in a patterned and etched second material layer 12, as shown in FIG. 4(e). It is preferable that the etch technology used, etch the second material layer 12 at a rate equal to or faster than the underlying first material substrate 16. It is also preferable that the etch process used be as uniform across the first material substrate 16 as possible.

If ion milling is used to pattern the second material layer 12, material may re-deposit around the perimeter of the masked features. This can make the removal of the masking photoresist layer very difficult. It can also modify the dimensions of the features being patterned in the second material layer 12, and it can leave behind unwanted material on the features. This is a common and undesirable attribute of ion milling, but can be readily resolved by perforating a short duration of time using ion milling at an oblique angle after the third material layer has been completely removed from the undesired areas. Re-deposition caused by ion milling can also be removed by ion milling at an oblique angle for periods of short times periodically during the ion milling from a more vertical or normal angle to the substrate.

The diameter of the third material layer 12 can be varied, depending on the emitter device 10 or 20 properties, and preferably is between 300 and 500 nanometers, although dimensions below and above this range may be acceptable or even desirable for certain applications.

If reactive ion etching or ion milling is used to pattern the second material layer 12, the photoresist mask may become hardened due to the exposure to the plasma or ions that are involved in this process, and thereby, the photoresist may become difficult to subsequently remove. Care must be taken in the resist removal process, given the thickness of the third material layer 11 to prevent removal, damage, degradation or contamination of the third material layer 11. This is important, given the extreme thinness of the third material layer 11.

Depending on the type of material used for layer 11, it may be desirable to perform an oxygen plasma exposure for a short duration of time to remove the hardened crust of photoresist. Subsequently, the remainder of the resist can be removed by other means, including but not limited to a solvent wet immersion strip. It may be important to not remove the entirety of the resist with an oxygen plasma, since exposure of the third material layer 11 to the plasma may oxidize, damage, or remove this layer.

The reason the third material layer 11 may be deposited before the second material layer 12 has been patterned and etched is that it may be difficult to perform accurate lithography on the third material layer 11 on the topology of the patterned and etched second material layer 12.

However, depending on the thicknesses, materials, and processing techniques used, it may be preferable to alternatively pattern and etch the second material layer 12, as shown in FIG. 4 (b1), prior to the third material layer 11 being deposited, as shown in FIG. 4 (c2). In this alternative process sequence, lithography is performed to pattern and etch the second material layer 12 after this layer 12 has been deposited, and possibly annealed, as shown in FIGS. 4 (b1) and 4 (b2). The lithography is used to define the second material layer 12 into the second predefined shapes and dimensions of the second material layer 12 at the top of the emitter devices 10 and 20. These shapes are preferably circular, although other shapes may be possible or even desirable. Importantly, the dimensional resolution of the lithography must be able to create sub-micron features with sub-micron registration accuracy for each layer. The lithography can be performed by several means, including, but not limited to, e-beam direct write lithography, interference lithography, or Deep Ultra-Violet (Deep UV or DUV) optical lithography.

Simultaneously, during this lithography and etch process to pattern the second material layer 12, alignment marks 25 may be patterned in the layer 12 so that subsequent layers can be accurately aligned (i.e., registered) to one another, as shown in FIG. 4 (b2).

The etching of the second material layer 12 on the first material substrate 16 can be performed using Reactive Ion Etching (RIE) or Deep Reactive Ion Etching (DRIE), ion milling, as well as wet chemical etching means resulting in a patterned and etched second material layer 12, as shown in FIGS. 4 (b1) and 4 (b2). It is preferable that the etch technology used, etch the second material layer 12 at a rate equal to or faster than the underlying first material substrate 16. It is also preferable that the etch process used be as uniform across the first material substrate 16 as possible.

If ion milling is used to pattern the second material layer 12, material may re-deposit around the perimeter of the masked features. This can make the removal of the masking photoresist layer very difficult. It can modify the dimensions of the features being patterned in the second material layer 12, and it can leave behind unwanted material on the features. This is a common and undesirable attribute of ion milling, but can be readily resolved by performing a short in time duration ion milling at an oblique angle after the third material layer has been completely removed from the undesired areas. Re-deposition caused by ion milling can also be removed by ion milling at an oblique angle for periods of short times periodically during the ion milling from a more vertical or normal angle to the substrate.

Subsequently, in this alternative embodiment, a third material layer 11 is deposited on the patterned and etched second material layer 12. As before, the third material layer 11 will preferably be electrically conductive. Additionally, it may be preferable that this third layer material 11 is also a catalyst for the growth of carbon nanotubes 18. Many material types can be chosen for this third layer material 11, including but not limited to Nickel or Iron. The criteria used for selecting third layer material 11 are discussed above. Preferably the third material layer 11 will have a thickness that can be less than 5 nanometers, between 5 and 10 nanometers, or more than 10 nanometers, depending on the properties desired of the emitter device 10, the properties of the type of third material layer 11 selected, and the processing complexity and fabrication compatibility issues involved.

The third material layer 11 may be deposited in this alternative embodiment using a number of commonly used deposition technologies, including, but not limited to: evaporation, sputtering, atomic layer deposition, etc.

After deposition of the third material layer 11, as shown in FIG. 4 (c2), lithography is performed to pattern and etch this third material layer 11 into the first predefined shapes and dimensions, as shown in FIG. 4 (e). The dimensional resolution of the lithography must be able to create sub-micron features with sub-micron registration accuracy for each layer. The lithography can be performed by several means including, but not limited to e-beam direct write lithography, interference lithography, or Deep Ultra-Violet (Deep UV or DUV) optical lithography.

The third material layer 11 is then etched using appropriate means of etching that can include, but is not limited to: Reactive Ion Etching (RIE), ion milling, as well as wet chemical etching means, as shown in FIG. 4 (e). It is preferable that the etch technology used etch the third material layer 11 at a rate equal to or faster than the underlying second material layer 12. It is also preferable that the etch process used on the third layer 11 be as uniform across the substrate as possible.

If ion milling is used to pattern the third material layer 11, material may re-deposit around the perimeter of the masked features. This can make the removal of the masking photoresist layer very difficult. It can also modify the dimensions of the features being patterned in the third material layer 11, and it can leave behind unwanted material on the features. This is a common and undesirable attribute of ion milling, but can be readily resolved by performing a short in time duration ion milling at an oblique angle after the third material layer has been completely removed from the undesired areas. Re-deposition caused by ion milling can also be removed by ion milling at an oblique angle for periods of short times periodically during the ion milling from a more vertical or normal angle to the substrate.

The diameter of the third material layer 11 can be varied depending on the emitter device 10 and 20 properties and preferably is between 100 and 150 nanometers, although dimensions below and above this range may be acceptable or even desirable for certain applications. The thickness of the material layer 11 made of Nickel can be varied depending on the emitter device 10 or 20 properties, and preferably is approximately 7 to 10 nanometers thick, although lesser or greater thicknesses may be desirable, depending on the material combination used and the field emitter properties desired.

If reactive ion etching or ion milling is used to pattern the third material layer 11, the photoresist mask may become hardened due to the exposure to the plasma or ions that are involved in these process, and thereby, the photoresist may become difficult to subsequently remove. Care must be taken in the resist removal process given the thickness of the third material layer 11 to prevent removal, damage, degradation or contamination of the third material layer 11. This is important given the extreme thinness of the third material layer 11.

Depending on the type of material used for this layer, it may be desirable to perform an oxygen plasma exposure for a short duration of time to remove the hardened crust of photoresist. Subsequently, the remainder of the resist can be removed by other means, including but not limited to a solvent wet immersion strip. It may be important to not remove the entirety of the resist with an oxygen plasma, since exposure of the third material layer 11 to the plasma may oxidize, damage, or remove this layer.

An alternative and sometimes preferred method of patterning the third material layer 11 in this alternative process sequence uses a technique known as "lift-off" which is an additive method for layer patterning, as opposed to subtractive methods of patterning such as etching. Using "lift-off", lithography is performed on the surface of the second material layer 12 of the substrate 16 using the inverse pattern of the third material layer 11. After exposure and development, as well as a possible cleaning to remove any residual polymers left in the openings, the third material layer 11 is deposited. Subsequently, the photoresist is lifted-off, thereby removing the unwanted material that is deposited on the resist and leaving behind the patterned third material layer 11, where it was deposited directly onto the underlying substrate surface (i.e., in places where the resist was absent) as shown in FIG. 4 (e).

Next, another lithography is performed to define the patterns for the etch process of the third predefined shapes and dimensions to form the pillars or posts 15 of the field emitter device 10 or 20. As before, the dimensional resolution of the lithography must be able to create sub-micron features with sub-micron registration accuracy for each layer. The lithography can be performed by several means including, but not limited to e-beam direct write lithography, interference lithography, or Deep Ultra-Violet (Deep UV or DUV) optical lithography. The photoresist is exposed and developed so as to form a photoresist mask where the pillars or posts are to be located. Using this lithography, either single pillar or post patterns or arrays of pillars or posts (FIG. 1 or 2) can be implemented depending on the application. Additionally, the dimensions of the pillars or posts may be chosen to bias these dimensions to compensate for lateral etch during the pillar or post etch, depending on the etch technology used to fabricate the pillars or posts. In general, the diameter of the resist will be equal, to or slightly larger than, the diameter of the second material layer 12.

After this lithography step has been completed, the exposed regions of the substrate are etched to form the high aspect ratio pillar or post structures, as shown in FIGS. 4 (*f*1) and 4 (*f*2). The depth of the etch will determine the height of the pillar or post from the substrate floor and have a significant impact on the behavior and operation of the field emitted device 10 or 20. The etching into the surface of the first material substrate 16 can be performed using Reactive Ion Etching (RIE) or Deep Reactive Ion Etching (DRIE) or even by wet chemical etching, with DRIE being preferred. This etch is difficult due to the extreme loading effects (i.e., the area of the substrate that is exposed and being etched) involved that may depending on the field emitter device 10 or 20 design approach a loading effect of nearly 100%. The preferred recipe using DRIE to form the pillars or posts is a continuous etch recipe with O2, C4F8, and SF6 gasses. The etch recipe will need to match to undercut requirements (lateral etch underneath the mask) for a given design. The undercut amount is mainly controlled by O2 flow. The O2 flow is typically between 30-100 sccm, where as C4F8 and SF6 flow rates are 5-20 sccm, and 75 sccm, respectively, Coil and platen powers are 800 W-2000 W and 10 W-40 W, respectively.

Depending on the selectivity of the first material substrate etch to the photoresist mask and the desired height of the pillars or posts, it may be desirable to form a hard mask layer for the pillar or post etch. That is, a hard mask that is composed of a material layer type that is more resistant to the pillar or post etch may be used in conjunction with, or as a replacement for the photoresist mask. A preferred embodiment for the hard mask is to deposit a thin layer of alumina (Al2O3) directly on the surface of substrate, including the regions with the patterned and etched second and third layer materials, and then perform lithography on this layer, whereby the alumina is left as a hard mask where the pillars or posts are to be defined. The etching of the exposed alumina can be done using immersion in photoresist developer solution. Once the pillar or post etch is complete, the alumina is removed by stripping any residual photoresist left on the hard mask and then immersing the substrate in photoresist developer solution sufficiently long that it is completely removed. The use of the hard mask material for the pillar or post etch allows the height of these structures to be made 30 microns or more, or even a few hundred microns if desired, depending on the thickness of the hard mask and the exact selectivity of the etch process used.

The third material layer 11 may be heated to a temperature to a point where the material softens or even melts, whereupon the surface tension effects of the third material layer 11 on the surface of the second material 12 can coalesce into an approximately hemi-spherical shape of a droplet and a diameter less than the original dimensions of this layer 11, as shown in FIG. 4 (*g*). This may be preferable for preparing the third material layer 11 for the growth of the carbon nanotubes 18.

Subsequently, the carbon nanaotubes 18 are grown on the areas of the pillars or posts where the catalyst is located using any of the methods used for carbon nanotube growth, such as Chemical Vapor Deposition (CVD) as shown in FIG. 4 (*h*).

As discussed above, it may be desirable for certain applications to fabricate the field emission devices without the carbon nanotube emitters grown at the top of the emitters, as shown in FIGS. 1 and 2, thereby resulting in the configuration of field emitter that is illustrated in FIG. 3. As can be seen from FIGS. 1 and 3, except for the absence of the carbon nanotubes 18 in FIG. 3, the implementation of the field emission device 10 shown in FIG. 3 is similar to the implementation of the field emission device shown in FIG. 1. In this regard, as stated above, the preferred method for fabrication of the field emission device 10, also known as the process sequence for the device 10, is illustrated in FIG. 4, which process sequence has several preferred variations, each of which begins with a highly electrically conductive substrate made of a first material 16, as shown in FIG. 4 (*a*). Thus, to make an electron field emission device without the carbon nanotubes, first, a suitable first material substrate 16 that is electrically conductive is again selected, as shown in FIG. 4(*a*). Next, again, a thin-film layer of second material layer 12 that is electrically conductive is deposited onto the first material substrate 16, as shown in FIG. 4(*b*). Patterning and etching the second material layer 12 into a second predefined shape and dimensions is again performed, as shown in FIG. 4(*b*1). Finally, patterning and performing an etching into the first material substrate 16 to a predefined depth to form a pillar or post shape structure 15 to a predefined height is shown in FIG. 4(*f*2) is also again performed. However, unlike the field emission device shown in FIG. 1, carbon nanaotubes 18 are not grown on the areas of the pillars or posts 15.

Depending on the application, it may be desirable to separate the substrate into individual dies. This may be difficult, given the fragility of the pillar or posts structures, and as such, special processing techniques need to be used. One method of die separation is to deposit a very thick layer of photoresist or polymer 32 onto the substrate 16 prior to die separation, as shown in FIG. 5. The thickness of the photoresist or polymer 32 may have a thickness equal to or greater than the height of the pillar or posts structures on the substrate. Subsequently, the substrate is then placed onto a diesaw and the diced into a plurality of individual die. Next, the photoresist or polymer layer is removed using appropriate means of which a wet chemical immersion in a polymer stripping agent would be preferred.

Figure 6:
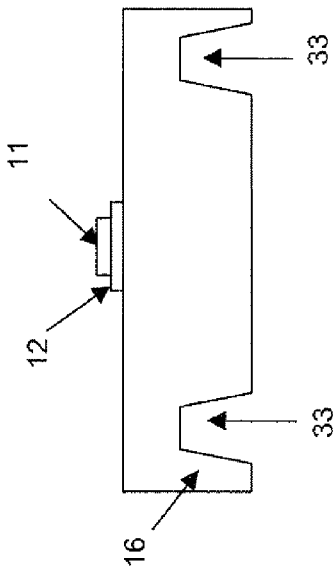
FIG. 6 is a cross-sectional illustration of a second preferred method for the separation of the field emission device substrate.

Another method of die separation is to etch into the substrate a sufficient depth so as to form cleaving trenches 33 in substrate 16, as shown in FIG. 6. The preferred method of etching these cleaving trenches 33 is DRIP, although other means of deep etching can be used, depending on the size of the die and the type of first material substrate 16 being used. Preferably, the cleaving trench 33 etch is performed on the backside of the substrate 16 and before the pillar or post etch has been performed. Once the fabrication of the device substrate is complete, the die can be separated from the substrate using a cleaving operation Yet another method of die separation is to take a separate substrate 34, perform lithography on that substrate 34, thereby exposing areas of the substrate, and then performing an etch into the substrate to form cavity 35 having a depth greater than the height of the pillar or posts 15 on the device substrate 16, as shown in FIG. 7. Subsequently, an adhesive, such as thermal tape 36 with adhesive on both sides is placed onto the substrate 34 with cavity 35 etched into its surface, as shown in FIG. 7 (*a*). The tape 36 may be patterned before or after it is placed onto the substrate surface 34. Next, the device substrate 16 with the pillars or posts 15 is bonded to the cavity substrate 34, thereby forming an enclosure for the individual pillars or posts 15, which will protect such pillars or posts 15 from damage as shown in FIG. 7 (*b*). The bonded composite substrates are then diced using a diesaw into individual dies. Since the locations of the dicing lines are not visible in the bonded composite substrate, it may be necessary to form alignment marks on the backside of the cavity or device substrate prior to them being bonded to one another. After dicing, the cavity die are removed from the device die, thereby exposing the pillar or post 15 device structures as shown in FIG. 7 (*c*).

Yet another method of die separation is to use a laser machine tool to cut the substrate into individual die. It may be necessary to place a protective coating, such as a photoresist or polymer layer, on the substrate surface prior to the laser dicing operation in order to protect the surface from re-deposited material. If a protective coating is used, the substrate will then be cleaned using an appropriate means of removing this protective coating material such as a solvent immersion.

Regardless of the die separation technique used, it is understood that die separation is preferably performed prior to the growth of the carbon nanotubes on the pillar or post structures.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of fabricating an electron field emission device using micro- and/or nano-fabrication techniques, the method comprising:
    selecting a first material substrate that is electrically conductive,
    depositing onto the first material substrate a second material layer that is electrically conductive,
    depositing onto a surface of the second material layer a third material layer that is electrically conductive,
    patterning and etching the third material layer into a first predefined shape and dimensions,
    patterning and etching the second material layer into a second predefined shape and dimensions,
    defining a pattern for an etch of a third predefined shape and dimensions into the first material substrate,
    performing the etch of the third predefined shape and dimensions into the first material substrate to a predefined depth to form a pillar or post,
    heating the first material substrate to a predefined temperature, whereby the third material layer re-forms into a predefined shape suitable for carbon nanotube growth, and
    growing at least one carbon nanotube on the third material layer to a predefined height.

2. The method of claim 1, wherein the third material layer is a catalyst for carbon nano-tube growth.

3. The method of claim 1, wherein the first material substrate is a semiconductor or metal material.

4. The method of claim 1, wherein the first material substrate is silicon.

5. The method of claim 1, wherein the second material layer is Titanium Nitride (TiN).

6. The method of claim 1, wherein the third material layer is Nickel or Iron.

7. The method of claim 1, wherein the third material layer is etched into the first predefined shape and dimensions using ion milling, reactive ion etching, or wet etching technology.

8. The method of claim 1, wherein the second material layer is etched into the second predefined shape and dimensions using ion milling, reactive ion etching, or wet etching technology.

9. The method of claim 7, wherein the third material layer is etched using ion milling and wherein re-deposited material of the third material layer resulting from ion milling is removed using oblique angle ion milling for a short period of time.

10. The method of claim 8, wherein the second material layer is etched using ion milling and wherein re-deposited material of the second material layer after ion milling is removed using oblique angle ion milling for a short period of time.

11. The method of claim 1, wherein alignment marks are made in the first material substrate to accurately register the first material substrate and the second and third material layers used to fabricate the at least one electron field emission device.

12. The method of claim 11, wherein alignment marks are patterned and etched in a surface of the first material substrate prior to the second material layer being deposited on the first material substrate.

13. The method of claim 11, wherein a fourth material layer is deposited onto the first material substrate prior to the deposition of the second material layer and the fourth material layer is patterned and etched to define alignment marks for the alignment of subsequent layers, which are then patterned and etched in the surface of the first material substrate prior to deposition of the second material layer.

14. The method of claim 13, wherein the fourth material layer is composed of thin film material layer types consisting of dielectrics; metals; and polymers.

15. The method of claim 1, wherein the third material layer has a thickness that is between 7 and 10 nanometers.

16. The method of claim 1, wherein the third material layer has a thickness that is less than 7 nanometers.

17. The method of claim 1, wherein the third material layer has a thickness that is more than 10 nanometers.

18. The method of claim 1, wherein the second material layer has a thickness that is approximately 50 nanometers.

19. The method of claim 1, wherein the second material layer has a thickness that is less than 10 nanometers.

20. The method of claim 1, wherein the second material layer has a thickness that is between 10 and 100 nanometers.

21. The method of claim 1, wherein the second material layer has a thickness that is more than 100 nanometers.

22. The method of claim 1, wherein the third material layer has a shape having a diameter that is between 100 and 150 nanometers.

23. The method of claim 1, wherein the third material layer has a shape having a diameter that is less than 100 nanometers.

24. The method of claim 1, wherein the third material layer has a shape having a diameter that is more than 150 nanometers.

25. The method of claim 1, wherein the second material layer has a shape having a diameter that is between 300 and 500 nanometers.

26. The method of claim 1, wherein the second material layer has a shape having a diameter that is less than 300 nanometers.

27. The method of claim 1, wherein the second material layer has a shape having a diameter that is more than 500 nanometers.

28. The method of claim 1, wherein the third material layer re-formed predefined shape employs a single pillar or post for each fabricated field emission device.

29. The method of claim 1, wherein the third material layer re-formed predefined shape employs an array of pillars or posts for each fabricated field emission device.

30. The method of claim 1, wherein the etch to form the pillar or post is performed so as to result in the pillar or post having a predefined height of 10 microns.

31. The method of claim 1, wherein the etch to form the pillar or post is performed so as to result in the pillar or post having a predefined height of between 10 microns and 30 microns.

32. The method of claim 1, wherein the etch to form the pillar or post is performed so as to result in the pillar or post having a predefined height of more than 30 microns.

33. The method of claim 1, wherein the etch used to form the pillar or post is Deep Reactive Ion Etching (DRIE).

34. The method of claim 33, wherein the etch used to form the pillar or post using Deep Reactive Ion Etching (DRIE) is performed with the following recipe: 70sccm$O_2$, 7 sccm C4F8, 75 sccm SF6, RF power of 900 W, and platen power of 20 W.

35. The method of claim 1, wherein a hard mask composed of $Al_2O_3$ is used for the etch of the third predefined shape and dimensions into the first material substrate to form the pillar or post.

36. The method of claim 5, wherein the second material layer is deposited using Chemical-Vapor Deposition (CVD) or Physical-Vapor Deposition (PVD) processes, or Atomic Layer Deposition (ALD).

37. The method of claim 36, wherein the second material layer is deposited using PVD, and wherein the PVD process is selected form a group consisting of reactive sputtering, sputtering, evaporation, or reactive evaporation.

38. The method of claim 6, wherein the third material layer is deposited using Chemical-Vapor Deposition (CVD) or Physical-Vapor Deposition (PVD) processes, or Atomic Layer Deposition (ALD).

39. The method of claim 38, wherein the third material layer is deposited using PVD, and wherein the PVD process is selected form a group consisting of reactive sputtering, sputtering, evaporation, or reactive evaporation.

40. The method of claim 4, wherein the silicon first material substrate is highly doped to make it electrically conductive.

41. The method of claim 40, wherein doping level of the silicon is greater than $1\times10^{19}$ dopants/cm$^3$.

42. The method of claim 37, wherein the second material layer is deposited by sputtering using a recipe composed of: 3 milli-Torr pressure of Ar/$N_2$ at 50 standard cubic centimeters per minute operating at a target sputtering power of 2000 Watts and a 350 kHz frequency with a 1.1 microsecond reverse phase duration.

43. The method of claim 5, wherein the percentage of Titanium to Nitrogen in the deposited TiN second material layer is approximately 50% to 50%.

44. The method of claim 5, wherein the Titanium Nitride second material layer has a smooth surface.

45. The method of claim 36, wherein the Titanium Nitride second material layer is annealed after the Titanium Nitride second material layer is deposited.

46. The method of claim 45, wherein the Titanium Nitride second material layer is annealed immediately after the second material layer is deposited.

47. The method of claim 45, wherein the Titanium Nitride second material layer is in-situ annealed after the second material layer is deposited.

48. The method of claim 45, wherein the Titanium Nitride second material layer is annealed using rapid thermal anneal (RTA) after the second material layer is deposited.

49. The method of claim 48, wherein the Titanium Nitride second material layer is annealed using rapid thermal anneal (RTA) with a background non-reactive gas consisting of Nitrogen or Argon and at a temperature of approximately 800° C. for 30 seconds.

50. The method of claim 1, wherein the third material layer is etched into a plurality of predefined shapes composed of circles.

51. The method of claim 1, wherein the second material layer is etched into a plurality of predefined shapes composed of circles.

52. The method of claim 1, wherein single-walled carbon nanotubes are grown on the third material layer.

53. The method of claim 1, wherein multi-walled carbon nanotubes are grown on the third material layer.

54. The method of claim 1, wherein the carbon nanotubes are grown by means of Chemical Vapor Deposition (CVD).

55. The method of claim 1, wherein the first material substrate is separated into individual die by depositing a layer of photoresist or polymer on the surface of the first material substrate after the etch of the third predefined shape and dimensions into the first material substrate to form the pillar or post has been completed and before the carbon nanotube growing has been performed, subsequently dicing the substrate into a plurality of individual die, and then removing said photoresist or polymer using a wet chemical immersion.

56. The method of claim 55, wherein the layer of photoresist or polymer deposited on the surface of the first material substrate has a thickness sufficient to encase the pillar or post on the first material substrate.

57. The method of claim 1, wherein the etch of the third predefined shape and dimensions into the first material substrate forms a plurality of pillars or posts on the first material substrate, and wherein the first material substrate is separated into a plurality of individual dies by etching cleaving trenches into the backside of the first material substrate before performing the etch of the third predefined shape and dimensions into the first material substrate to form the pillar or post, the method further comprising performing the fabrication of the field emission device up to a point before growing the at least one carbon nanotube on the third material layer, and then cleaving the first material substrate into the plurality of individual dies.

58. The method of claim 1, wherein the etch of the third predefined shape and dimensions into the first material substrate forms a plurality of pillars or posts on the first material substrate, and wherein the method further comprises etching cavities into a cavity substrate of a depth greater than the height of the pillars or posts fabricated on the first material substrate, placing a double-sided thermal tape onto the cavity substrate that has been etched with the cavities, bonding the cavity substrate and the first material substrate together to form a sealed cavity to thereby enclose the pillars or posts in the sealed cavity, dicing the first material substrate and the cavity substrate into a plurality of individual device dies and cavity dies, respectively, and then separating the cavity dies from the device dies, to thereby expose the pillars or posts.

59. The method of claim 58, wherein the thermal tape is patterned prior to placing onto the cavity substrate.

60. The method of claim 59, wherein alignment marks are formed into a backside of the cavity substrate or the first material substrate prior to the cavity and first material substrates being bonded to one another so as to facilitate exactly locating dicing lines prior to performing dicing of the cavity and first material substrates.

61. The method of claim 1, wherein separation of the cavity substrate from the first material substrate is performed using a laser machine tool to cut the first material substrate and the cavity substrate into the plurality of individual device dies and cavity dies, respectively.

62. The method of claim 61, wherein a photoresist or polymer layer protective coating is deposited on a surface of the first material substrate prior to the laser machine tool cutting the first material substrate and the cavity substrate into the plurality of individual device dies and cavity dies, respectively, in order to protect the first material substrate surface from re-deposited material, and then removing the protective coating using a solvent immersion after the first material substrate has been cut into the plurality of individual device dies.

63. The method of claim 14, wherein the fourth material layer is a dielectric selected from the group consisting of oxides, nitrides and oxy-nitrides.

64. The method of claim 14, wherein the fourth material layer is a metal selected from the group consisting of aluminum and platinum.

65. The method of claim 14, wherein the fourth material layer is a polymer selected from the group consisting of photoresist and polyimide.

* * * * *